United States Patent [19]
Ohno et al.

[11] Patent Number: 5,894,307
[45] Date of Patent: Apr. 13, 1999

[54] COMMUNICATIONS APPARATUS WHICH PROVIDES A VIEW OF ONESELF IN A VIRTUAL SPACE

[75] Inventors: Takashi Ohno; Kazuki Matsui; Akinori Iwakawa; Naohisa Kawaguchi, all of Kawasaki, Japan

[73] Assignee: Fujitsu Limited, Kawasaki, Japan

[21] Appl. No.: 08/770,637

[22] Filed: Dec. 19, 1996

[30] Foreign Application Priority Data

Jul. 19, 1996 [JP] Japan ................. 8-191085

[51] Int. Cl.⁶ .................................................. G06F 3/00
[52] U.S. Cl. .......................... 345/355; 345/330; 345/332
[58] Field of Search .......................... 345/329, 331, 345/330, 332, 355, 419, 420, 427

[56] References Cited

U.S. PATENT DOCUMENTS

| | | | |
|---|---|---|---|
| 5,347,306 | 9/1994 | Nitta | 348/15 |
| 5,359,703 | 10/1994 | Robertson et al. | 345/355 |
| 5,491,743 | 2/1996 | Shiio et al. | 348/15 X |
| 5,590,268 | 12/1996 | Doi et al. | 345/326 |

FOREIGN PATENT DOCUMENTS

| | | |
|---|---|---|
| 8-63416 | 3/1994 | Japan. |
| 6-121311 | 4/1994 | Japan. |

Primary Examiner—Raymond J. Bayerl
Assistant Examiner—Cao H. Nguyen
Attorney, Agent, or Firm—Staas & Halsey

[57] ABSTRACT

There is provided a communication apparatus for exchanging messages while a virtual space and avatars (symbols) of users are displayed on a display screen. The communication apparatus has a viewpoint element inputting unit for inputting a viewpoint element (a viewpoint position and a viewpoint direction). An image of the virtual space is produced on the basis of the viewpoint element inputted from the viewpoint element inputting unit. According to the communication apparatus, it is possible to increase a degree of freedom in plotting the virtual space.

4 Claims, 12 Drawing Sheets $\theta$ : INCREASE $\pi/180$ BY $\pi/180$ EVERY ONE SECOND CAMERA POSITION $(x,y,z)=(\sin\theta, 1, \cos\theta)$ CAMERA POSITION $(dx,dy,dz)=(0,1,0)$

COMMUNICATIONS APPARATUS WHICH PROVIDES A VIEW OF ONESELF IN A VIRTUAL SPACE

BACKGROUND OF THE INVENTION

Field of the Invention

The present invention relates to a communication apparatus connected to a message communication system in which a plurality of user terminals are interconnected, and messages are exchanged among the plurality of user terminals. The communication apparatus is utilized in the form of such a user terminal.

Recently, there has been developed a message communication system referred to as a so-called chat system in which messages are exchanged between user terminals through a so-called personal computer communication and the like.

FIG. 16 is a conceptual diagram of a message communication system comprising so-called servers and clients.

A plurality of user terminals, or a plurality of client computers 100_1, 100_2, ...., 100_n are connected through a communication network 200 to a host computer 300 which serves as a server, so as to exchange messages among the client computers 100_1, 100_2, ...., 100_n via the host computer 300.

In such a message communication system, there is known a system comprising a common virtual world when the system is viewed as a whole, and the client computers 100_1, 100_2, ...., 100_n having their own symbols referred to as so-called avatars, in which the client computer, who intends to have a message exchange or communication, displays an its display screen the virtual world and avatars or symbols of the clients entered the virtual world just as if a plurality of clients, who are of interest in communication, enter the virtual world and have conversations.

FIG. 17 is an illustration showing exemplarily a display image of a client computer in which the virtual world and symbols as mentioned above are displayed.

In a virtual world display area 111 of a display screen 110 illustrated in FIG. 17, four persons (symbols of four clients) are displayed, and the total five persons including one's own self enter the same scene (virtual space) in the virtual world. A message exchange is performed among these five persons (five client computers). In a message display area 112 of the display screen 110, there are displayed messages exchanged among those five persons entered (five client computers). A click of scroll buttons 113a and 113b with the use of a mouse (not illustrated) makes it possible to scroll the display content in the message display area 112.

In a case where a virtual space is displayed on a display screen, a two-dimensional image, which can be displayed on the display screen, is plotted on the basis of graphic data representative of a three-dimensional figure. In this case, when the two-dimensional image is plotted, there is raised a problem that the virtual space is seen from what viewpoint position and in what eyes direction. According to the explanation made referred to FIG. 17, it is assumed that the images shown in FIG. 17 have been plotted on the basis of a viewpoint element (viewpoint position and eyes direction) of the symbol of one's own self.

FIG. 18 is a schematic diagram showing a functional structure of a client computer adapted to perform a plotting in accordance with the viewpoint element of the symbol of one's own self.

In FIG. 18, an viewpoint element determining means 11 determines a viewpoint element of the symbol of one's own self, that is, viewpoint position and eyes direction, on the basis of a symbol element 1 representative of a coordinate position in a virtual space of the symbol of one's own self (oneself client), a direction which the symbol looks toward, and the like.

A two-dimensional image producing means 12 produces two-dimensional images in case of looking based on the viewpoint element of the symbol of one's own self a virtual space in which the symbol of one's own self is located.

The client computer shown in FIG. 18 is provided with an image display unit 14 having a display screen 14a on which images are displayed. A plotting means 13 plots on the display screen 14a of the image display unit 14 the two-dimensional images produced by the two-dimensional image producing means 12.

In the client computer, thus, the two-dimensional images as shown in FIG. 17 are displayed on the display screen 14a.

In this manner, when the two-dimensional images are displayed on the basis of the viewpoint element of the symbol of one's own self, images looking through eyes of the symbol of one's own self are displayed. Consequently, there will be obtained the reality as if one's own self enters the virtual space. However, the symbol of one's own self is not displayed on the two-dimensional images. According to the recent system, there is provided a delicate constitution such that symbols can make various performances, for example, changing their expression in several ways and raising their hands, by client's operation. However, there is a problem such that even if expression and performance of the symbol of one's own self are changed by the operation of oneself client, one's own self cannot confirm the expression and performance of one's own symbol on the display screen of oneself client.

In order to solve such a problem, it is considered that two-dimensional image based on a viewpoint element different from that of the symbol of one's own self, for example, such a two-dimensional image that one's own self sees from the seats a movie in which one's own self appears on the scene, is produced and displayed on a display screen. In this case, while oneself client can confirm the expression and performance of one's own symbol on the display screen of oneself client, it will be difficult for oneself client to have an impression such that one's own self enters the virtual world.

SUMMARY OF THE INVENTION

In view of the foregoing, it is therefore an object of the present invention to provide a communication apparatus, which is adapted to be used in the form of the above-mentioned client, having a plotting system well matched with respect to a point such that two-dimensional images in the virtual space are plotted on the basis of what viewpoint element.

To attain the above-mentioned object, according to the present invention, there is provided a first communication apparatus, adapted to be used as a user terminal, connected to a message communication system in which a plurality of user terminals (clients) are interconnected, the plurality of user terminals sharing virtual spaces and symbols each defined for an associated one of the user terminals and appended with an associated viewpoint element consisting of a viewpoint position and a view point direction in the virtual space, and messages are exchanged among the plurality of user terminals while an image of the virtual space in which the symbols are arranged is displayed in the respective user terminals, said communication apparatus comprising:

an image display unit having a display screen for displaying images;

viewpoint element input means for inputting a viewpoint element to produce an image representative of the virtual space to be displayed on the display screen of said image display unit;

image producing means for producing an image representative of the virtual space in case of looking at a viewpoint direction constituting the viewpoint element inputted by said viewpoint element input means from a viewpoint position constituting the viewpoint element; and plotting means for plotting the image produced by said image producing means on the display screen of said image display unit.

According to the first communication apparatus of the present invention, there is provided the viewpoint element input means for inputting a viewpoint element. When it is desired for an operator to have an expression such that one's own self enters the virtual world, the viewpoint element is inputted through the viewpoint element input means in such a manner that a two-dimensional image based on the viewpoint element of a symbol of one's own self is produced. And when it is desired for the operator to confirm expressions and movements of one's own symbol, a viewpoint element other than the viewpoint element involved in the symbol of one's own self, for example, a viewpoint direction looking at one's own symbol from a viewpoint position in front of the symbol of one's own self is inputted through the viewpoint element input means. In this manner, it is possible to perform such a confirmation.

It is acceptable that the viewpoint element input means is provided with a handler for optionally designating a viewpoint position and a viewpoint direction, for example, a mouse and a track ball, alternatively, the viewpoint element input means is provided with a plurality of push buttons or the like each corresponding to the associated one of a plurality of viewpoint elements, for example, a viewpoint element of one's own symbol, a viewpoint element looking at one's own symbol from the front, and the like.

To attain the above-mentioned object, according to the present invention, there is provided a second communication apparatus, adapted to be used as a user terminal, connected to a message communication system in which a plurality of user terminals (clients) are interconnected, the plurality of user terminals sharing virtual spaces and symbols each defined for an associated one of the user terminals and appended with an associated viewpoint element consisting of a viewpoint position and a view point direction in the virtual space, and messages are exchanged among the plurality of user terminals while an image of the virtual space in which the symbols are arranged is displayed in the respective user terminals, said communication apparatus comprising:

an image display unit having a display screen for displaying images;

viewpoint element automatic determining means for sequentially altering a viewpoint element to produce an image representative of the virtual space to be displayed on the display screen of said image display unit;

image producing means for producing an image representative of the virtual space in case of looking at a viewpoint direction constituting the viewpoint element inputted by said viewpoint element automatic determining means from a viewpoint position constituting the viewpoint element; and plotting means for plotting the image produced by said image producing means on the display screen of said image display unit.

According to the second communication apparatus of the present invention, there is provided the viewpoint element automatic determining means for sequentially altering a viewpoint element. This feature makes it possible to obtain sequentially, for example, an opportunity to confirm expressions and movements of one's own symbol and an opportunity to have an impression such that one's own self enters in the virtual world.

To attain the above-mentioned object, according to the present invention, there is provided a third communication apparatus, adapted to be used as a user terminal, connected to a message communication system in which a plurality of user terminals (clients) are interconnected, the plurality of user terminals sharing virtual spaces and symbols each defined for an associated one of the user terminals and appended with an associated viewpoint element consisting of a viewpoint position and a view point direction in the virtual space, and messages are exchanged among the plurality of user terminals while an image of the virtual space in which the symbols are arranged is displayed in the respective user terminals, said communication apparatus comprising:

an image display unit having a display screen for displaying images;

image producing means for producing a plurality of images representative of the virtual spaces each based on an associated one of a plurality of viewpoint elements; and plotting means for plotting a plurality of images produced by said image producing means on the display screen of said image display unit.

According to the third communication apparatus of the present invention, there are displayed on the display screen a plurality of images based on a plurality of viewpoint elements. This feature makes it possible to look at one virtual space from mutually different plural angles.

To attain the above-mentioned object, according to the present invention, there is provided a fourth communication apparatus, adapted to be used as a user terminal, connected to a message communication system in which a plurality of user terminals (clients) are interconnected, the plurality of user terminals sharing virtual spaces and symbols each defined for an associated one of the user terminals and appended with an associated viewpoint element consisting of a viewpoint position and a view point direction in the virtual space, and messages are exchanged among the plurality of user terminals while an image of the virtual space in which the symbols are arranged is displayed in the respective user terminals, said communication apparatus comprising:

an image display unit having a display screen for displaying images;

image producing means for producing an image representative of the virtual space in case of looking at a viewpoint direction constituting a viewpoint element of a symbol defined on a communication apparatus of one's own self from a viewpoint position constituting the viewpoint element; and plotting means for plotting both the image produced by said image producing means and the symbol defined on the communication apparatus of one's own self on the display screen of said image display unit.

According to the fourth communication apparatus of the present invention, while a viewpoint element in plotting the virtual space is, similar to the conventional one, the viewpoint element of the symbol of one's own self, the symbol of one's own self is displayed in combination with the image of the virtual space. This feature makes it possible for an operator to have an impression such that one's own self enters the virtual world, and also to confirm expressions and movements of the symbol of one's own self.

To attain the above-mentioned object, according to the present invention, there is provided a fifth communication apparatus, adapted to be used as a user terminal, connected to a message communication system in which a plurality of user terminals (clients) are interconnected, the plurality of user terminals sharing virtual spaces and symbols each defined for an associated one of the user terminals and appended with an associated viewpoint element consisting of a viewpoint position and a view point direction in the virtual space, and messages are exchanged among the plurality of user terminals while an image of the virtual space in which the symbols are arranged is displayed in the respective user terminals, said communication apparatus comprising:

an image display unit having a display screen for displaying images;

image producing means for producing an image representative of the virtual space in case of looking at a viewpoint direction constituting a viewpoint element applied to anyone of symbols arranged in the virtual space except for a symbol defined on a communication apparatus of one's own self from a viewpoint position constituting the viewpoint element; and plotting means for plotting the image produced by said image producing means on the display screen of said image display unit.

In the fifth communication apparatus of the present invention, it is preferable that said plotting means plots on the display screen of said image display unit both the image produced by said image producing means and the symbol having the viewpoint element involved in producing of said image produced by said image producing means.

As one technique adopting a viewpoint element different from the viewpoint element of the symbol of one's own self, according to the fifth communication apparatus of the present invention, there is utilized a viewpoint element of another symbol except for the symbol of one's own self.

In such case, it happens that a symbol of another person using the viewpoint element mentioned above is not displayed on the display screen. In view of this matter, according to the fifth communication apparatus of the present invention, the symbol of the another person is displayed in combination with the image of the virtual space. This feature makes it possible to confirm expressions and movements of the symbol of the another person.

DESCRIPTION OF THE PREFERRED EMBODIMENTS

Hereinafter, there will be described embodiments of the present invention.

Figure 1:
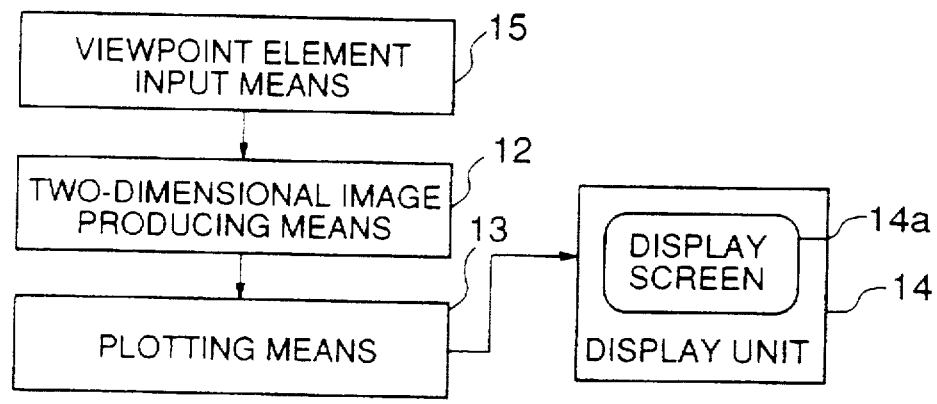
FIG. 1 is a schematic diagram showing a functional structure of the first communication apparatus according to one embodiment of the present invention.
Figure 2:
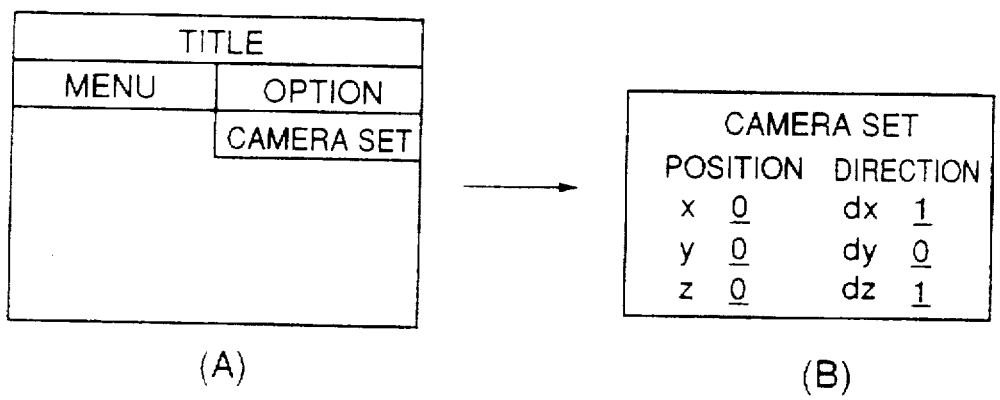
FIG. 2 is an explanatory view useful for understanding the function of the first communication apparatus shown in FIG. 1.

FIG. 1 is a schematic diagram showing a functional structure of the first communication apparatus according to one embodiment of the present invention. FIG. 2 is an explanatory view useful for understanding the function of the first communication apparatus shown in FIG. 1.

The communication apparatus shown in FIG. 1 has a viewpoint element input means 15 for inputting viewpoint elements. The viewpoint element input means 15 is provided with a handler, for example, a mouse and the like. When a menu screen shown in part (A) of FIG. 2 is opened on the display screen 14a and an icon of "option" is clicked through the mouse operation, a "camera set" appears as one of the sub-menus of the "option". Then, an icon of "camera set" is clicked. As a result, a camera set of screen appears as shown in part (B) of FIG. 2. The camera set of screen is a screen for setting up position and direction (or viewpoint elements) of a camera for projecting a virtual space onto the display screen. The viewpoint elements are entered by means of sequentially inputting on a numerical basis positions and directions of directions x, y and z through a keyboard.

A direction (dx, dy, dz) of a camera represents that the camera looks toward the point defined by (dx, dy, dz). According to the example shown in part (B) of FIG. 2, the position (x, y, z)=(0, 0, 0) and the direction (dx, dy, dz)=(1, 0, 1). This means that the camera is set up to the origin of the virtual space and is turned toward a direction looking at the point of (x, z)=(1, 1) on an x-z plane from the set up position.

A two-dimensional image producing means 12 shown in FIG. 1 produces two-dimensional images of the virtual space in accordance with the viewpoint elements thus entered.

Figure 3:
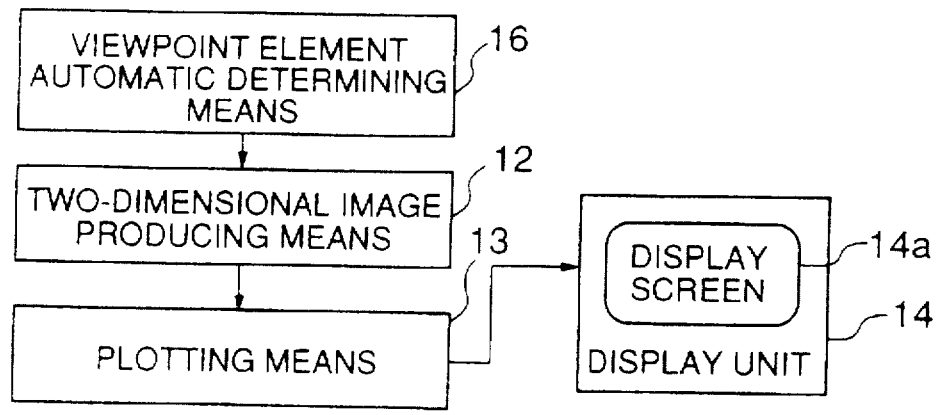
FIG. 3 is a schematic diagram showing a functional structure of the second communication apparatus according to another embodiment of the present invention.
Figure 4:
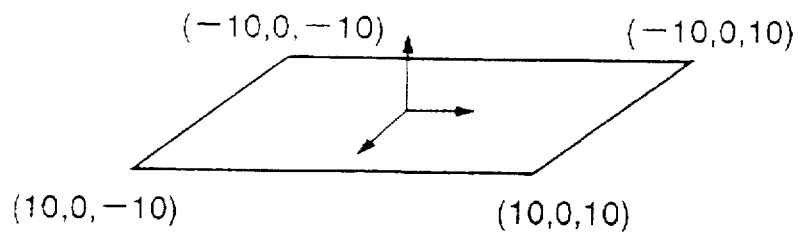
FIG. 4 is an explanatory view useful for understanding the function of the second communication apparatus shown in FIG. 3.

FIG. 3 is a schematic diagram showing a functional structure of the second communication apparatus according to another embodiment of the present invention. FIG. 4 is an explanatory view useful for understanding the function of the second communication apparatus shown in FIG. 3.

The communication apparatus shown in FIG. 3 has a viewpoint element automatic determining means 16. As shown in FIG. 4, assuming that there are provided camera position (x, y, z)=(sinθ, 1, cosθ) and the camera direction (dx, dy, dz)=(1, 0, 1), the viewpoint element automatic determining means 16 moves the camera in a direction such that θ increases π/180 by π/180 every one second. In other words, the viewpoint element automatic determining means 16 moves the camera to turn for 360° every six minutes on an x-y plane at y=1, while always turning eyes of the camera toward a direction looking at the y-axis. In this manner, according to the viewpoint element automatic determining means 16, the viewpoint elements are automatically sequentially altered in accordance with a predetermined program. A two-dimensional image producing means 12 shown in FIG. 3 produces two-dimensional images in the virtual space in accordance with the updated viewpoint elements, whenever the viewpoint elements are updated.

Figure 5:
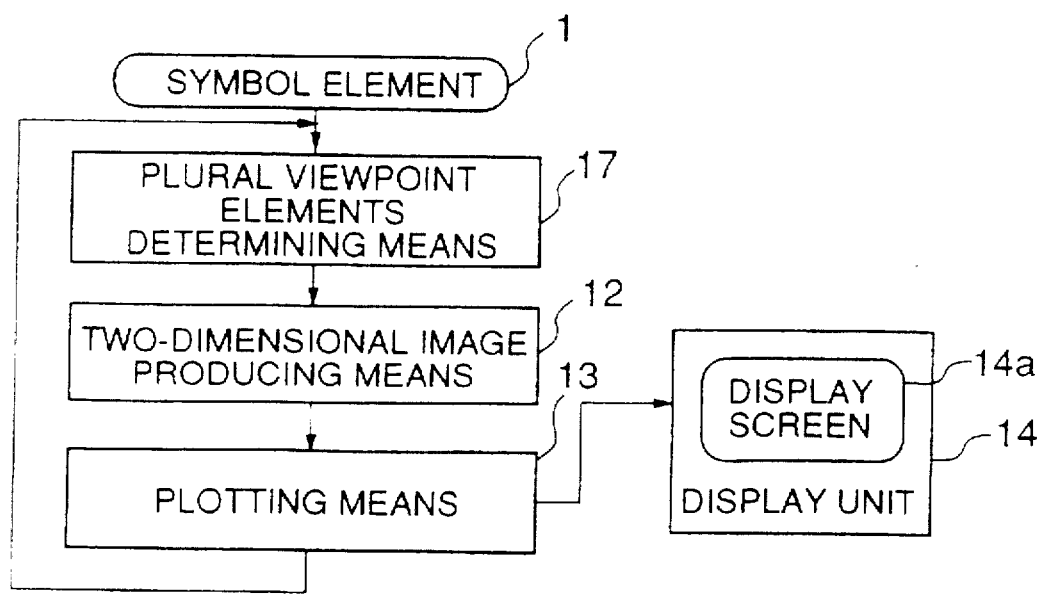
FIG. 5 is a schematic diagram showing a functional structure of the third communication apparatus according to still another embodiment of the present invention.
Figure 6:
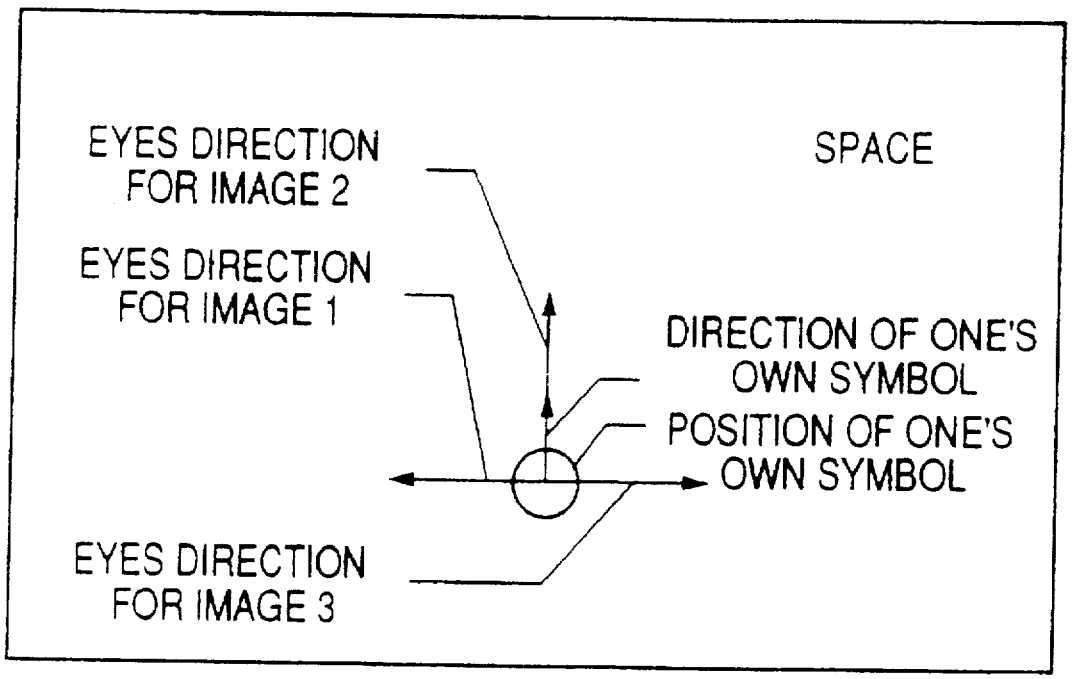
FIG. 6 is an explanatory view useful for understanding the function of the third communication apparatus shown in FIG. 5.
Figure 7:
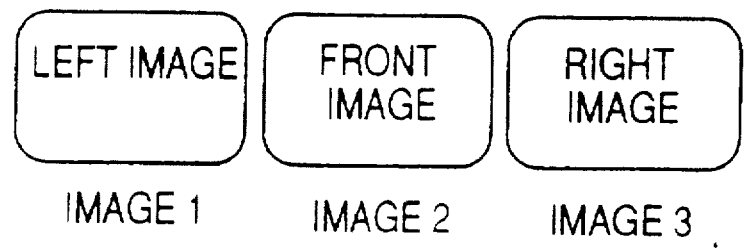
FIG. 7 is a diagram used for the explanation of images produced by the third communication apparatus shown in FIG. 5.

FIG. 5 is a schematic diagram showing a functional structure of the third communication apparatus according to still another embodiment of the present invention. FIG. 6 is an explanatory view useful for understanding the function of the third communication apparatus shown in FIG. 5. FIG. 7 is a diagram used for the explanation of images produced by the third communication apparatus shown in FIG. 5.

The communication apparatus shown in FIG. 5 has a plural viewpoint elements determining means 17 for determining a plurality of viewpoint elements. The plural viewpoint elements determining means 17 determines viewpoint elements involved in looking forward the front, the left side and the right side of the symbol of one's own self, respectively, as shown in FIG. 6, in accordance with the viewpoint element of oneself symbol. A two-dimensional image producing means 12 shown in FIG. 5 produces three pieces of two-dimensional images based on these three viewpoint elements, respectively, as shown in FIG. 7.

Figure 8:
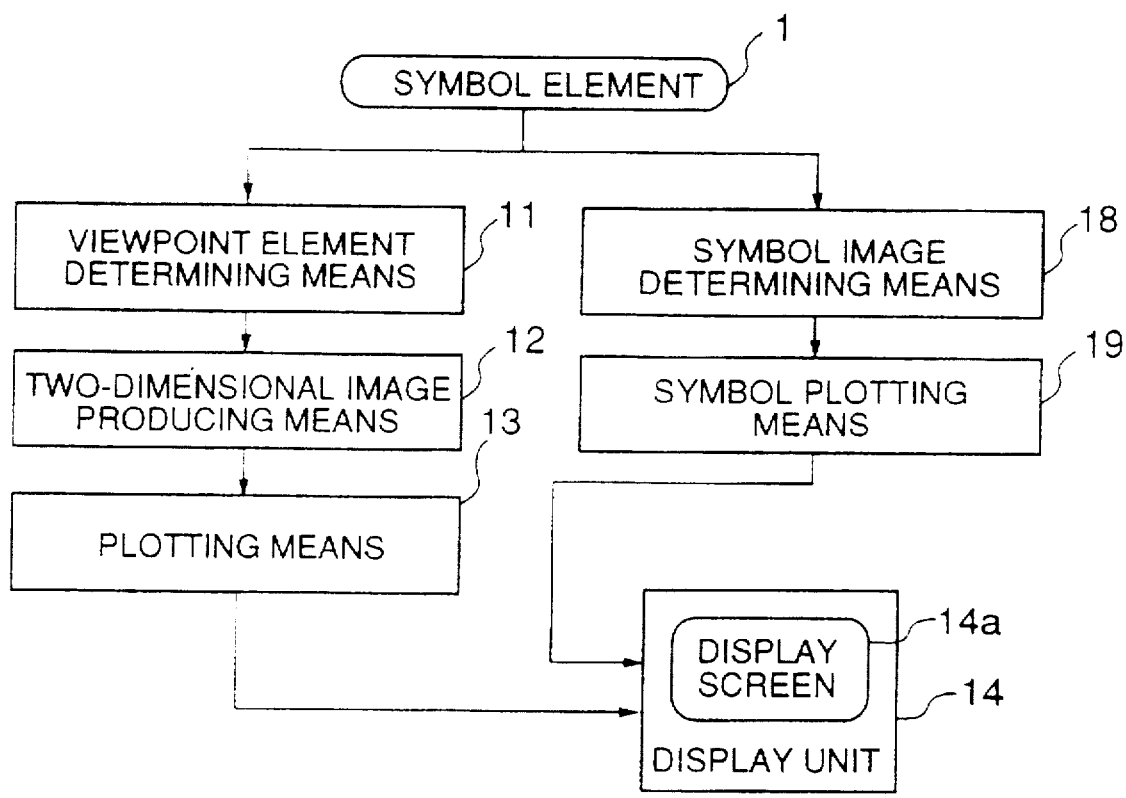
FIG. 8 is a schematic diagram showing a functional structure of the fourth communication apparatus according to still another embodiment of the present invention.
Figure 9:
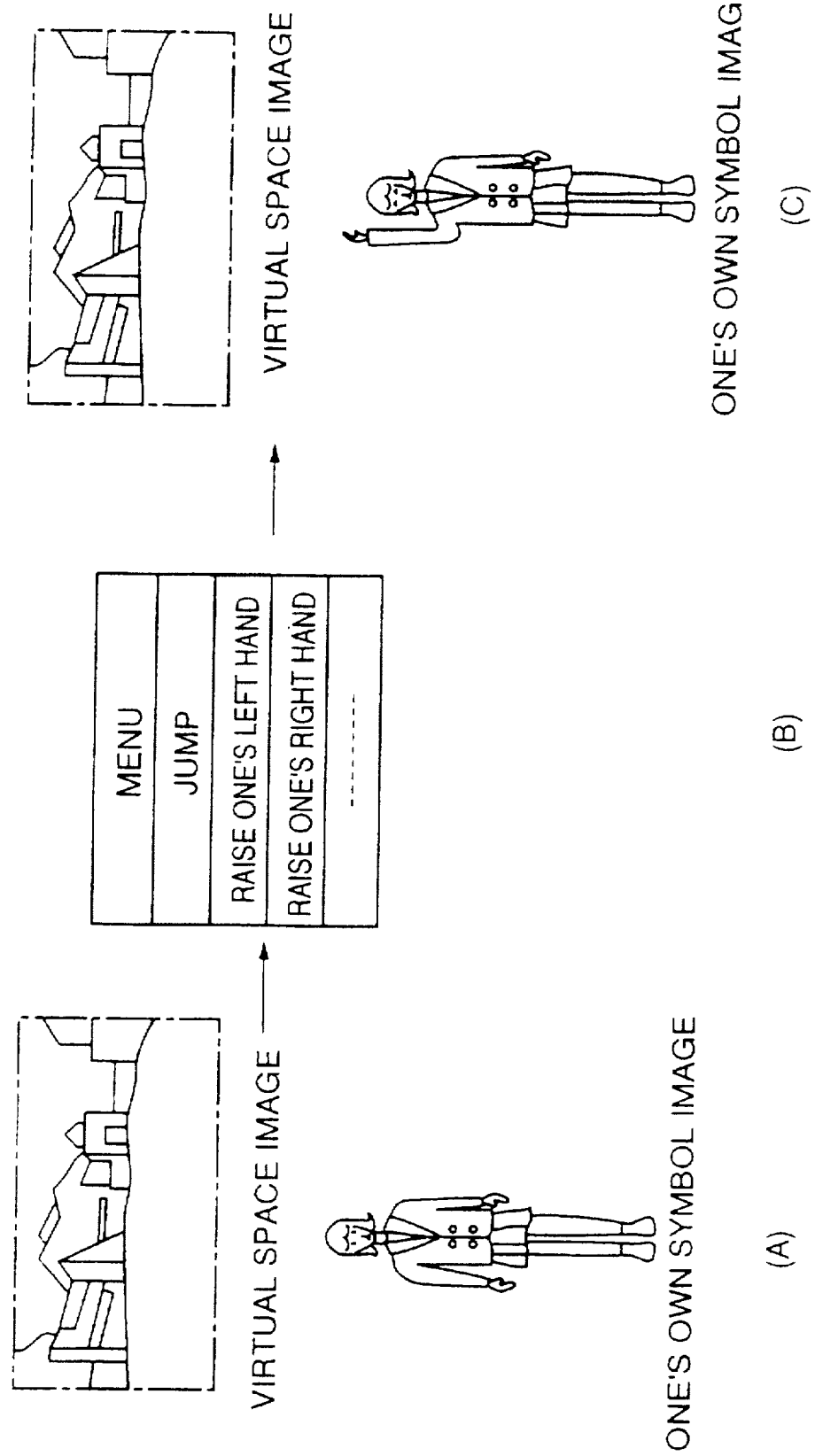
FIG. 9 is an explanatory view useful for understanding the function of the fourth communication apparatus shown in FIG. 8.

FIG. 8 is a schematic diagram showing a functional structure of the fourth communication apparatus according to still another embodiment of the present invention. FIG. 9 is an explanatory view useful for understanding the function of the fourth communication apparatus shown in FIG. 8.

Figure 18:
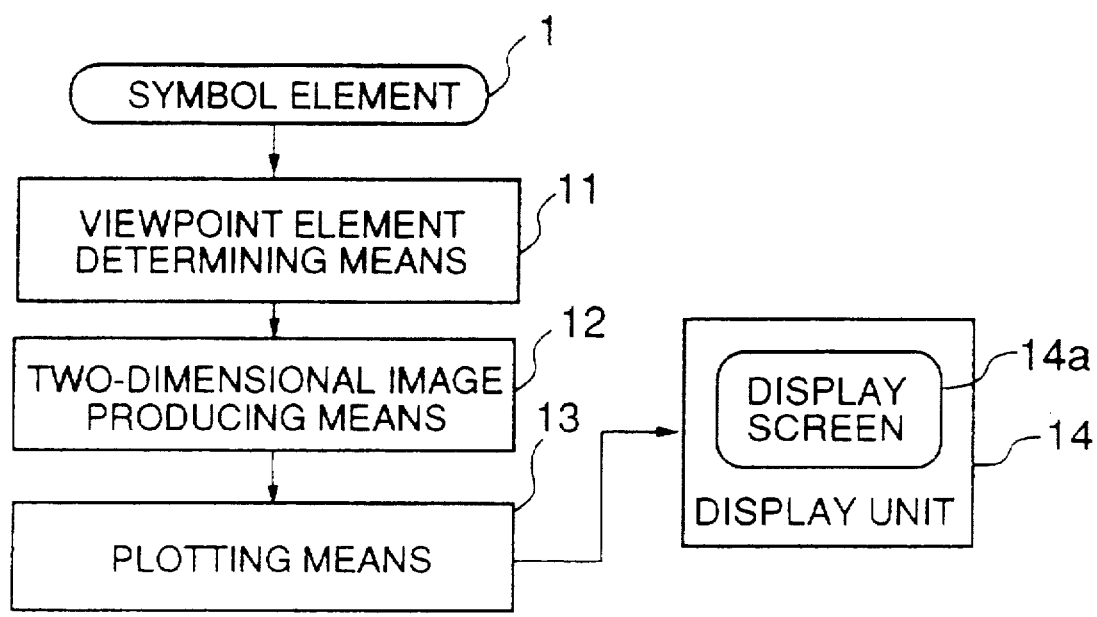
FIG. 18 is a schematic diagram showing a functional structure of a client computer adapted to perform a plotting in accordance with the viewpoint element of the symbol of one's own self.

The communication apparatus shown in FIG. 8 has a symbol image determining means 18 for determining a symbol image, and a symbol plotting means 19, in addition to the respective blocks constituting the conventional communication apparatus shown in FIG. 18.

The symbol image determining means 18 determines a symbol image, as will be described later, in accordance with a symbol element representative of one's own symbol. The symbol plotting means 19 plots an image of one's own symbol on a display screen 14a in accordance with the determination by the symbol image determining means 18. On the display screen 14a, as shown in part (A) of FIG. 9, there are displayed both an image of the virtual space plotted by a plotting means 13 and an image of one's own symbol plotted by the symbol plotting means 19, by way of example, in such a way that they are placed in a vertical line.

The symbol image determining means 18 is provided with a handler such as a mouse and the like. A symbol image is altered in accordance with an operation through the handler. For example, when one's own symbol is displayed in part (A) of FIG. 9, a menu screen indicative of movements of one's own symbol is displayed as shown in part (B) of FIG. 9. In this condition, if the icon of, for example, "raise one's right hand" is clicked, the symbol image determining means 18 makes such a determination that one's own symbol raising her right hand is displayed. Thus, the symbol plotting means 19 plots one's own symbol raising her right hand, as shown in part (C) of FIG. 9, in accordance with the determination by the symbol image determining means 18.

Figure 10:
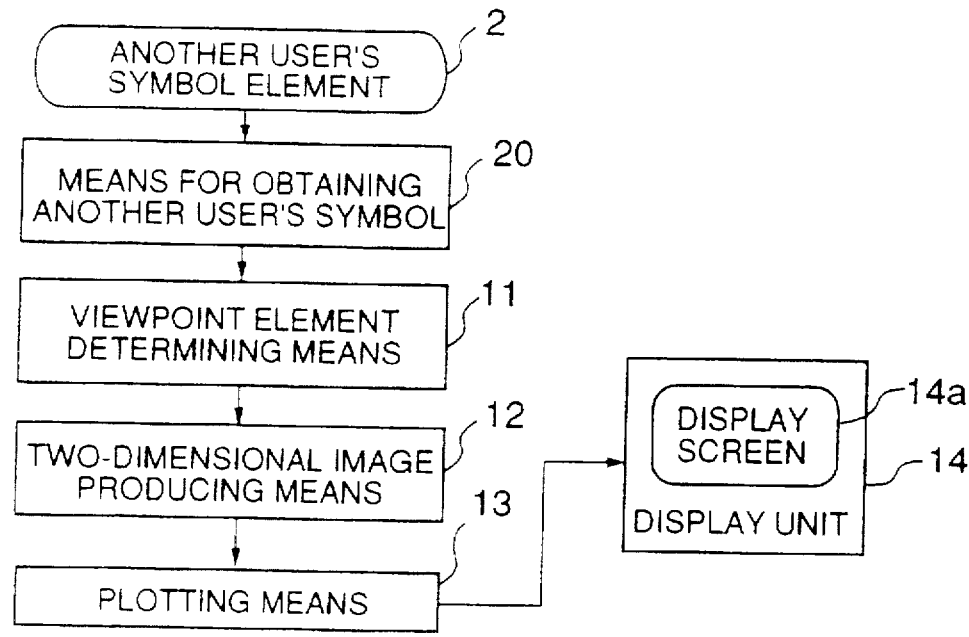
FIG. 10 is a schematic diagram showing a functional structure of the fifth communication apparatus according to still another embodiment of the present invention.

FIG. 10 is a schematic diagram showing a functional structure of the fifth communication apparatus according to still another embodiment of the present invention.

Figure 16:
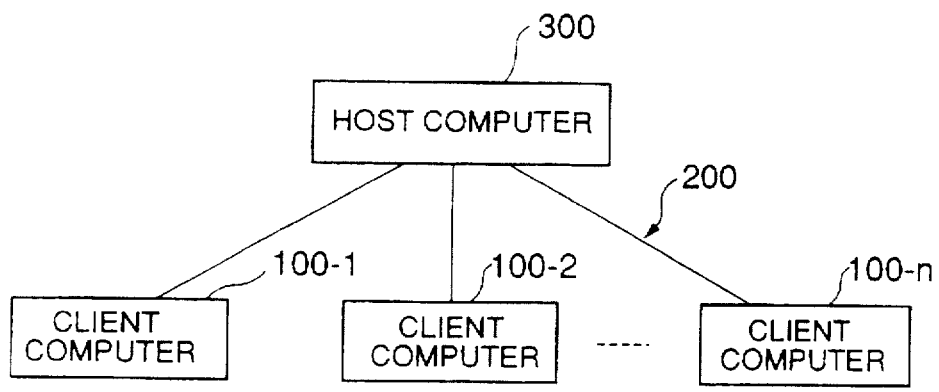
FIG. 16 is a conceptual diagram of a message communication system comprising so-called servers and clients.
Figure 17:
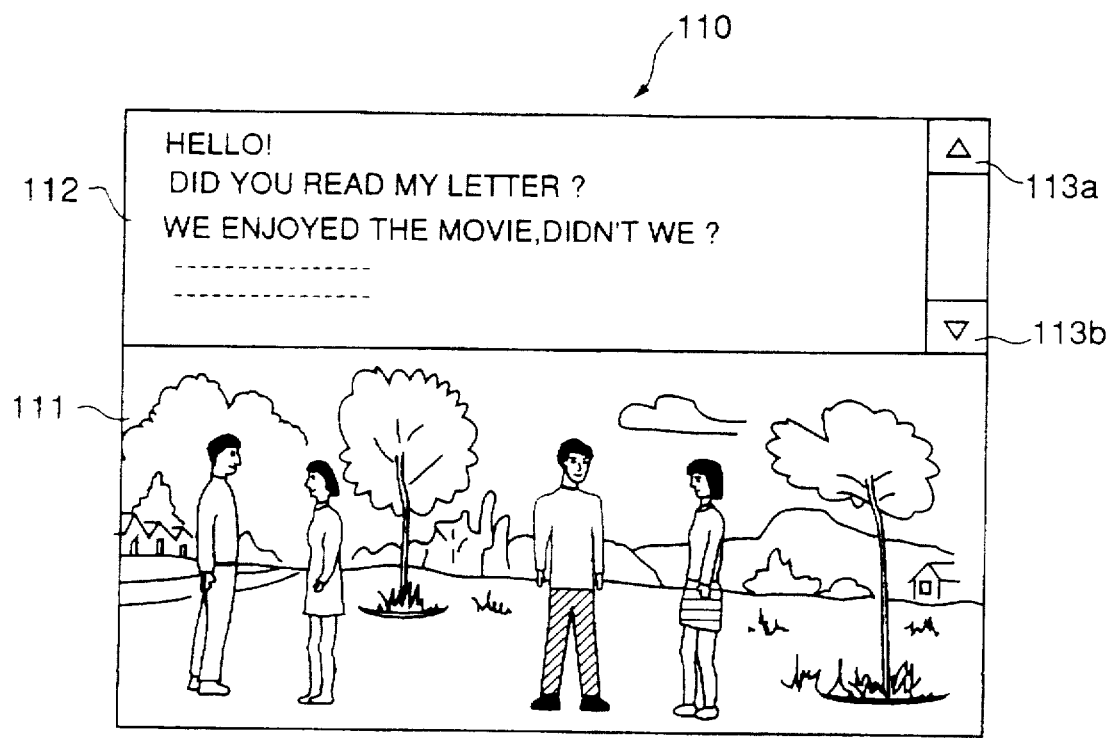
FIG. 17 is an illustration showing exemplarily a display image of a client computer in which the virtual world and symbols as mentioned above are displayed.

The communication apparatus shown in FIG. 10 has an another user's symbol obtaining means 20 for obtaining an element (another user's symbol element 2) of another user's symbol other than the symbol of one's own self to determine a viewpoint element. The another user's symbol obtaining means 20 obtains the viewpoint elements of the symbols of the clients, from the communication apparatuses (client computers) of other users connected through the communication network 200 and the host computer 300 as shown in FIG. 16, via the host computer 300. A viewpoint element determining means 11 extracts the viewpoint element of another user on the basis of another user's symbol element 2 thus obtained by the another user's symbol obtaining means 20. A two-dimensional image producing means 12 shown in FIG. 10 produces two-dimensional images of the virtual space looking from the viewpoint element of another user.

Figure 11:
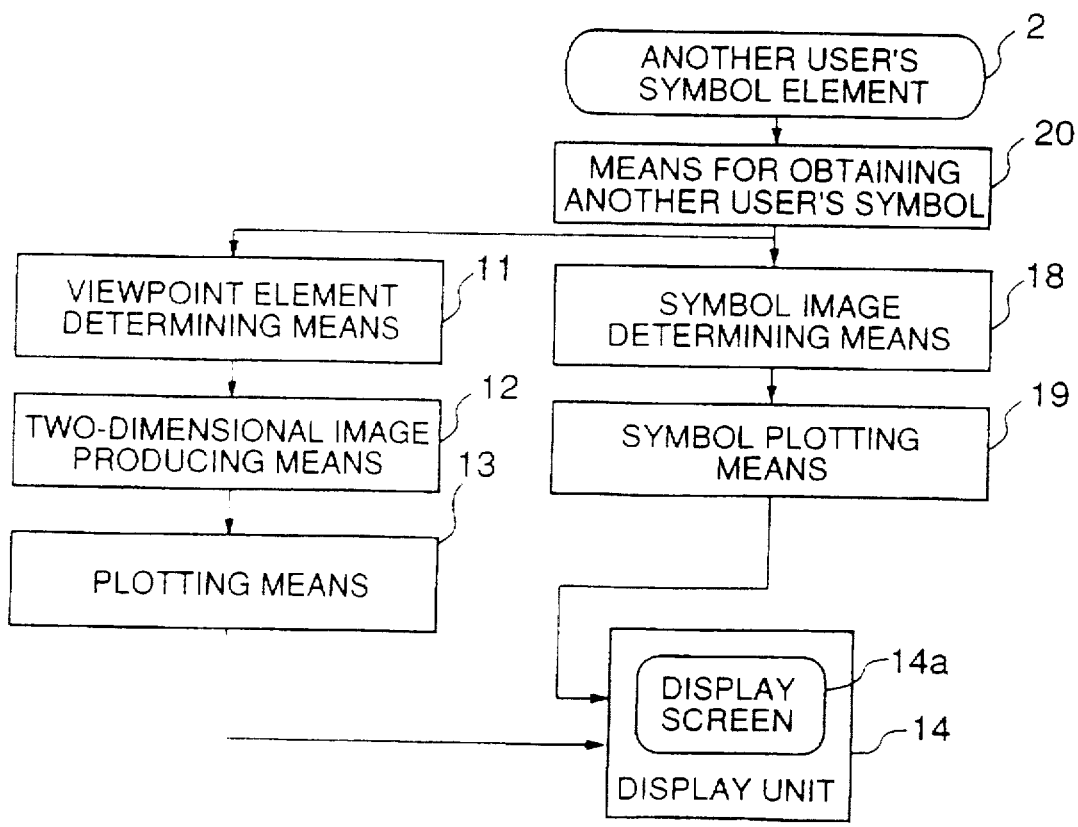
FIG. 11 is a schematic diagram showing a functional structure of a modification of the fifth communication apparatus according to still another embodiment of the present invention.

FIG. 11 is a schematic diagram showing a functional structure of a modification of the fifth communication apparatus according to still another embodiment of the present invention.

The communication apparatus shown in FIG. 11 has a symbol image determining means 18 and a symbol plotting means 19, which are similar to those in the communication apparatus shown in FIG. 8, in addition to the respective blocks constituting the communication apparatus shown in FIG. 10. Specifically, according to the communication apparatus shown in FIG. 11, there are displayed on the display screen 14a both two-dimensional images of the virtual space looking from the viewpoint element of another user and an image of the symbol of another user, for example, in a similar arrangement to that shown in part (A) of FIG. 9.

Figure 12:
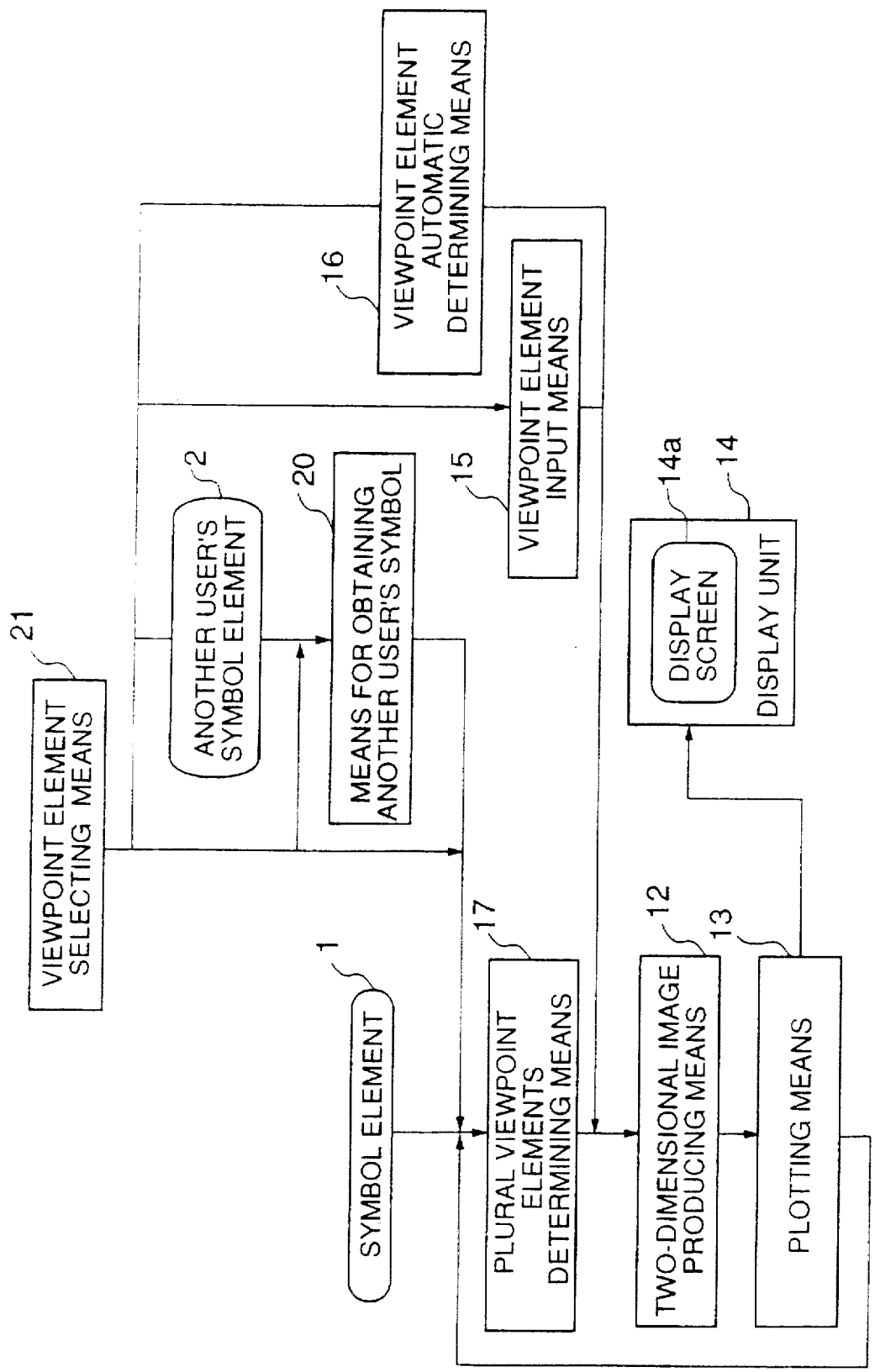
FIG. 12 is a schematic diagram showing a functional structure of a communication apparatus as a combined system of the first, second, third and fifth communication apparatuses of the present invention.
Figure 13:
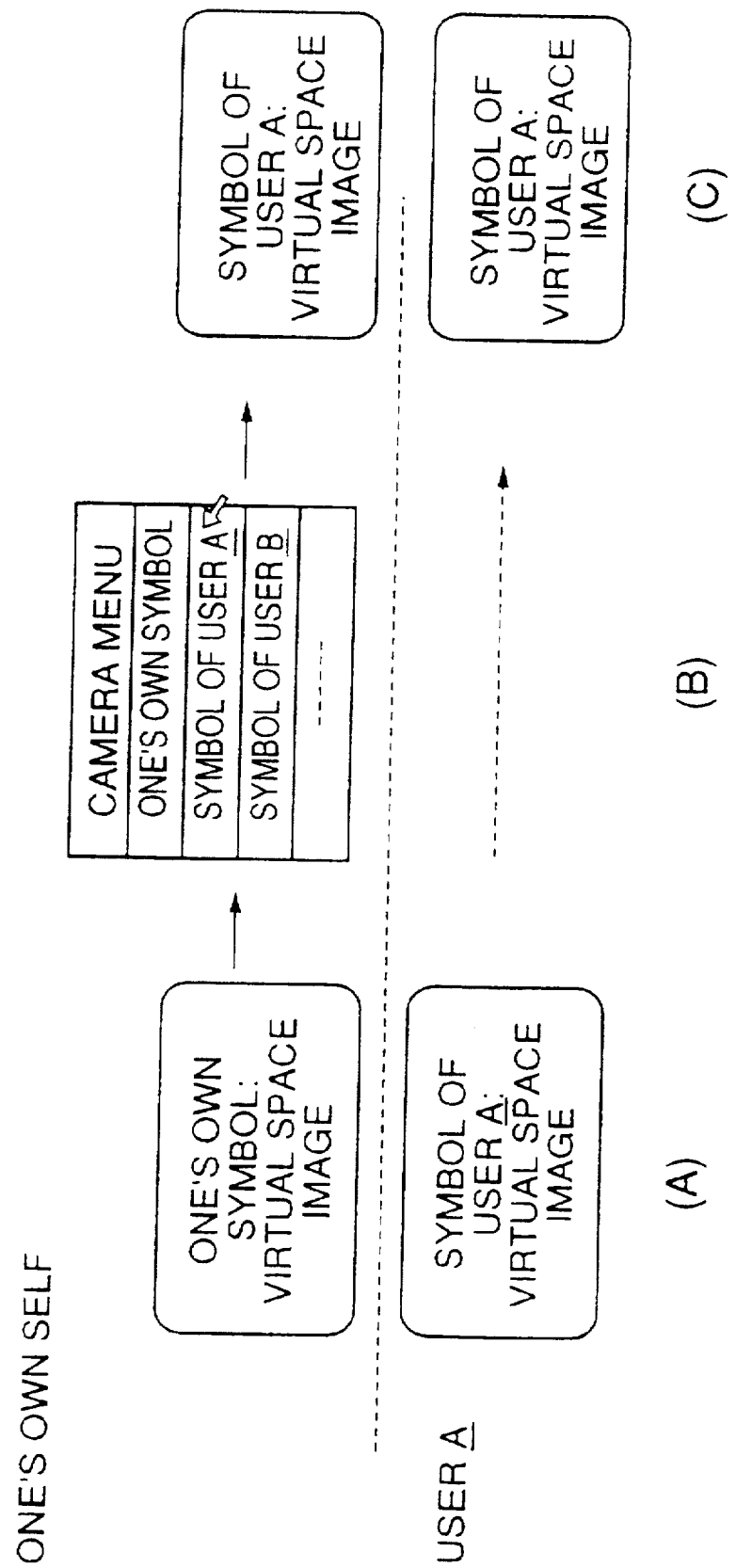
FIG. 13 is an explanatory view useful for understanding the function of the communication apparatus shown in FIG. 12.

FIG. 12 is a schematic diagram showing a functional structure of a communication apparatus as a combined system of the first, second, third and fifth communication apparatuses of the present invention. FIG. 13 is an explanatory view useful for understanding the function of the communication apparatus shown in FIG. 12.

The communication apparatus shown in FIG. 12 has the viewpoint element input means 15 as an aspect of the first communication apparatus shown in FIG. 1, the viewpoint element automatic determining means 16 as an aspect of the second communication apparatus shown in FIG. 3, the plural viewpoint elements determining means 17 as an aspect of the third communication apparatus shown in FIG. 5, the another user's symbol obtaining means 20 as an aspect of the fifth communication apparatus shown in FIG. 10, and a viewpoint element selecting means 21. The communication apparatus shown in FIG. 12 is arranged so as to be able to select optionally characteristic two-dimensional images formed by the respective aspects of the communication apparatuses.

The viewpoint element selecting means 21 is provided with, for example, a mouse. In a case where two-dimensional images of the virtual space looking from the viewpoint element of one's own symbol are displayed on the display screen of the communication apparatus of one's own self as shown in part (A) of FIG. 13 for example, while two-dimensional images of the virtual space looking from the viewpoint element of the symbol of user A, who is one of other users, are displayed on the display screen of the communication apparatus of user A, a "camera menu" of screen as shown in part (B) of FIG. 13 is displayed on the display screen of the communication apparatus of one's own self through an operation of the mouse. In this condition, if a "symbol of user A" of icon is clicked, the two-dimensional images of the virtual space looking from the viewpoint element of the symbol of user A, which are the same as those appearing on the display screen of the communication apparatus of user A, are displayed also on the display screen of the communication apparatus of one's own self.

Figure 14:
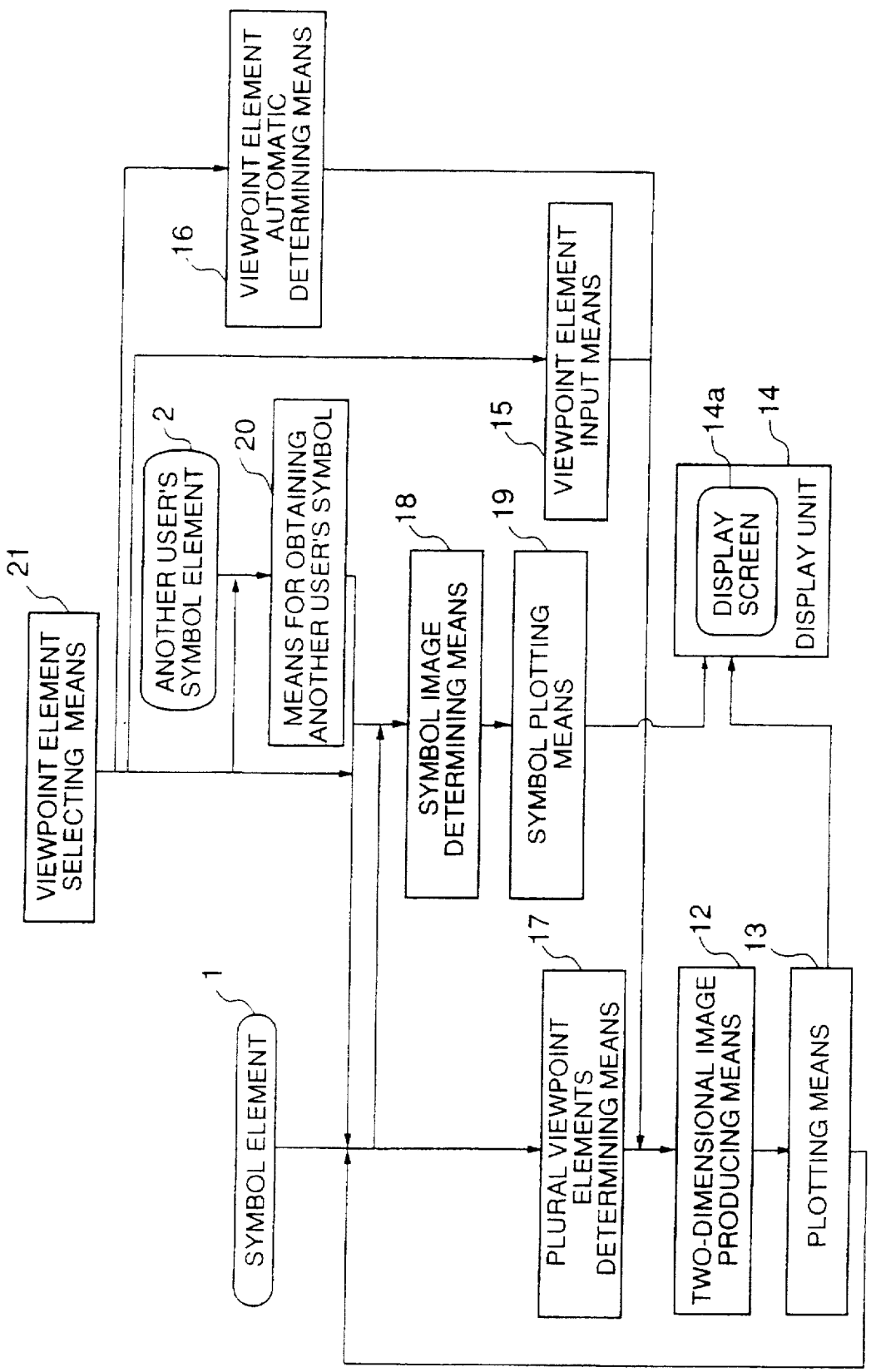
FIG. 14 is a schematic diagram showing a functional structure of a communication apparatus as a combined system of the first, second, third, fourth and fifth communication apparatuses of the present invention, the communication apparatus having a function of displaying two-dimensional images in the virtual space and images of symbols as well on a parallel basis.
Figure 15:
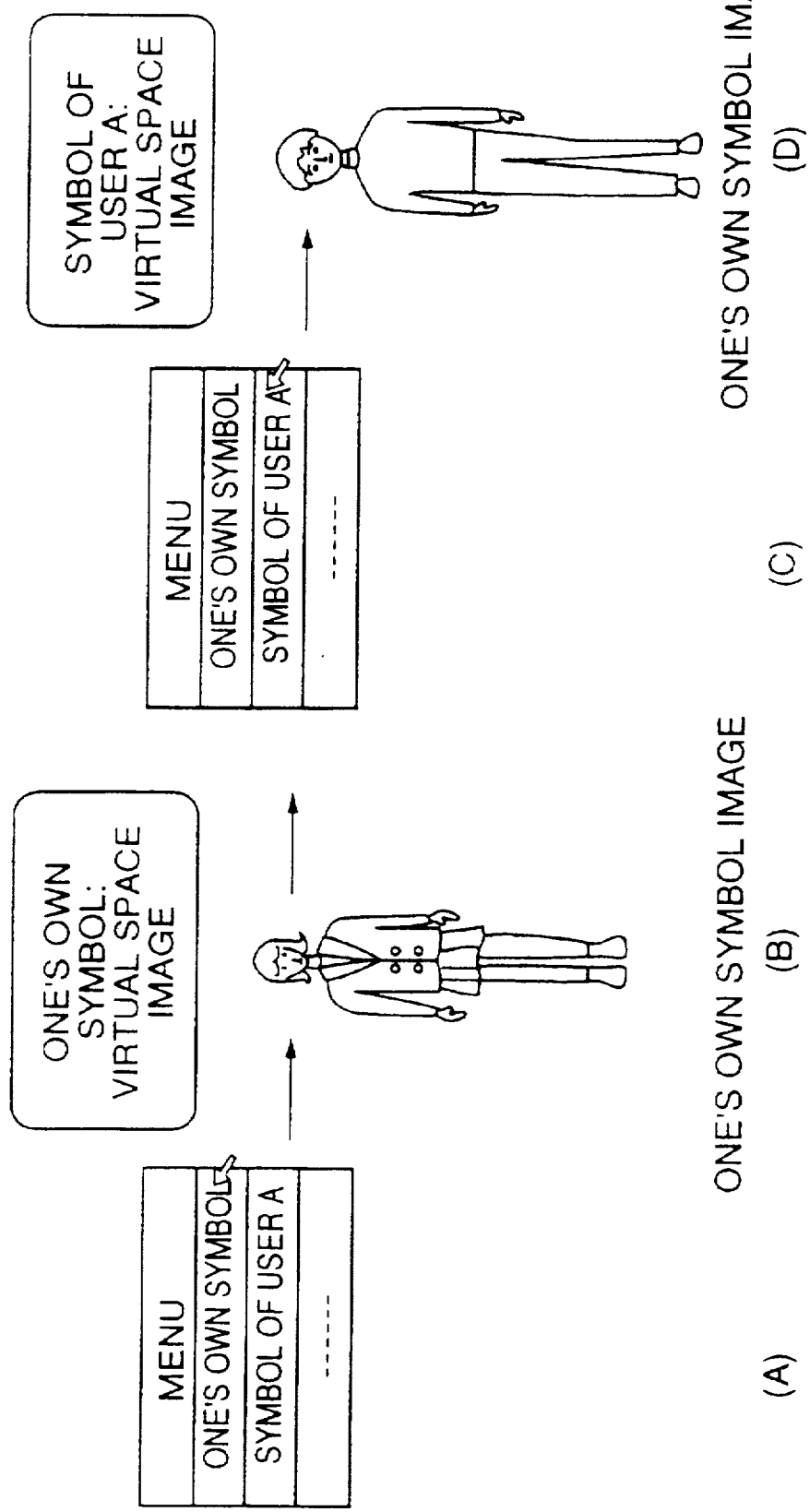
FIG. 15 is an explanatory view useful for understanding the function of the communication apparatus shown in FIG. 14.

FIG. 14 is a schematic diagram showing a functional structure of a communication apparatus as a combined system of the first, second, third, fourth and fifth communication apparatuses of the present invention, the communication apparatus having a function of displaying two-dimensional images in the virtual space and images of symbols as well on a parallel basis. FIG. 15 is an explanatory view useful for understanding the function of the communication apparatus shown in FIG. 14.

A viewpoint element selecting means 21 constituting the communication apparatus shown in FIG. 14 is provided with, for example, a mouse. In a case where a menu screen shown in part (A) of FIG. 15 is opened on a display screen 14a. In this condition, if a "one's own symbol" of icon is clicked, there is displayed on the display screen 14a, as shown in part (B) of FIG. 15, two-dimensional images of the virtual space looking from the viewpoint element of one's own symbol and an image of one's own symbol in such a manner that they are arranged in a vertical line. Next, as shown in part (C) of FIG. 15, the menu screen is opened again. In this condition, if a "symbol of user A" of icon is clicked, there is displayed on the display screen 14a, as shown in part (D) of FIG. 15, two-dimensional images of the virtual space looking from the viewpoint element of the symbol of user A and an image of the symbol of user A in such a manner that they are arranged in a vertical line.

It is acceptable to construct the communication apparatus according to the present invention in the form of a combined system as shown in the embodiments of FIGS. 12 and 14.

As mentioned above, according to the present invention, it is possible to implement a communication apparatus capable of providing an excellent operational environment in which a degree of freedom in plotting of the virtual space is increased.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A communication apparatus acting as one of a plurality of user terminals connected to a message communication system, the plurality of user terminals sharing a virtual space using symbols defined for each user terminal, said communication apparatus comprising:

a display having a display screen for displaying images;

image producing means for producing a plurality of images representative of the virtual space, each image based on one of a plurality of viewpoint elements, each viewpoint element having a viewpoint position and a viewpoint direction; and plotting means for simultaneously plotting the plurality of images produced by said image producing means on the display screen of said display.

2. A communication apparatus acting as one of a plurality of user terminals connected to a message communication system, the plurality of user terminals sharing a virtual space using symbols defined for each user terminal, said communication apparatus comprising:

a display having a display screen for displaying images;

image producing means for producing an image representative of the virtual space when looking at a viewpoint direction from a viewpoint position where the symbol of the communication apparatus exists in the virtual space; and plotting means for simultaneously plotting both the image produced by said image producing means and the symbol of the communication apparatus on the display screen of said display.

3. A communication apparatus acting as one of a plurality of user terminals, connected to a message communication system, the plurality of user terminals sharing a virtual space using symbols defined for each user terminal including a first symbol defined for the communication apparatus, said communication apparatus comprising:

a display having a display screen for displaying images, image producing means for producing an image representative of the virtual space as seen by anyone of the symbols arranged in the virtual space except for the first symbol; and plotting means for plotting the image produced by said image producing means on the display screen of said display.

4. A communication apparatus according to claim 3, wherein said plotting means plots on the display screen of said display both the image produced by said image producing means and the symbol involved in producing the image produced by said image producing means.

* * * * *